(12) United States Patent
Ferrari

(10) Patent No.: US 11,197,408 B2
(45) Date of Patent: Dec. 14, 2021

(54) ULTRASONIC SENSORS FOR FIELD ROUGHNESS MEASUREMENT

(71) Applicant: CNH Industrial America LLC, New Holland, PA (US)

(72) Inventor: Luca Ferrari, Formigine (IT)

(73) Assignee: CNH Industrial America LLC, New Holland, PA (US)

( * ) Notice: Subject to any disclaimer, the term of this patent is extended or adjusted under 35 U.S.C. 154(b) by 615 days.

(21) Appl. No.: 16/085,449

(22) PCT Filed: Mar. 15, 2017

(86) PCT No.: PCT/EP2017/056095
§ 371 (c)(1),
(2) Date: Sep. 14, 2018

(87) PCT Pub. No.: WO2017/158006
PCT Pub. Date: Sep. 21, 2017

(65) Prior Publication Data
US 2020/0329626 A1    Oct. 22, 2020

(30) Foreign Application Priority Data
Mar. 18, 2016 (IT) .......................... UA2016A001821

(51) Int. Cl.
*A01B 79/00* (2006.01)
*A01B 63/00* (2006.01)
(Continued)

(52) U.S. Cl.
CPC .......... *A01B 79/005* (2013.01); *A01B 63/002* (2013.01); *G01S 15/08* (2013.01);
(Continued)

(58) Field of Classification Search
CPC ... A01B 79/005; A01B 63/002; A01B 49/027; G01S 15/08; G01S 19/00
See application file for complete search history.

(56) References Cited

U.S. PATENT DOCUMENTS

2011/0153168 A1* 6/2011 Peterson et al. ..... A01B 79/005
701/50

FOREIGN PATENT DOCUMENTS

AU     563491 B2    7/1987
CN    102589487 A    7/2012
(Continued)

OTHER PUBLICATIONS

European International Search Report PCT/EP2017/056095 dated Mar. 15, 2017.

*Primary Examiner* — Tara Mayo-Pinnock
(74) *Attorney, Agent, or Firm* — Rebecca L. Henkel; Rickard K. DeMille

(57) ABSTRACT

A system measures the roughness of the ground surface over which an agricultural implement passes as measured in the direction of travel. The system includes at least one ground sensor attached to the agricultural implement that provides measurement of the distance to the ground. A controller is connected to the at least one ground sensor, and controls at least one adjustment of the agricultural implement. The at least one ground sensor provides instantaneous output based on the distance to the ground to the controller. The controller then calculates at least one statistical parameter from the instantaneous output. The at least one statistical parameter is calculated from variations in the distance to the ground in the direction of travel of the agricultural implement.

14 Claims, 5 Drawing Sheets

(51) Int. Cl.
*G01S 15/08* (2006.01)
*G01S 19/00* (2010.01)
*A01B 49/02* (2006.01)
*A01B 63/22* (2006.01)

(52) U.S. Cl.
CPC ............. *G01S 19/00* (2013.01); *A01B 49/027* (2013.01); *A01B 63/22* (2013.01)

(56) References Cited

FOREIGN PATENT DOCUMENTS

| | | |
|---|---|---|
| CN | 102706295 B | 11/2014 |
| EP | 0177024 A2 | 4/1986 |
| EP | 0254984 A1 | 2/1988 |
| WO | WO2012102667 A1 | 8/2012 |

\* cited by examiner

ULTRASONIC SENSORS FOR FIELD ROUGHNESS MEASUREMENT

CROSS-REFERENCE TO RELATED APPLICATIONS

This application is a national phase application of PCT international Application No. PCT/EP2017/056095, filed on Mar. 15, 2017, which is based upon and claims the right of priority to Italian Application No. UA2016A001821, filed on Mar. 18, 2016, the disclosures of both of which are hereby incorporated by reference herein in their entirety for all purposes.

BACKGROUND OF THE INVENTION

The present invention relates to agricultural tillage implements, and, more particularly, to agricultural field cultivators. More specifically, the present invention relates to a system that uses one or more remote ground sensors to measure the distance to the ground at high resolution, and which uses the output of the one or more remote ground sensors to calculate statistical information representing the roughness of the ground surface after and/or before it is worked by an agricultural tillage implement.

Farmers utilize a wide variety of agricultural tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth thereby providing excellent conditions for planting of a crop. Grass or residual crop material disposed on top of the soil is also worked into the seedbed so that it does not interfere with a seeding implement subsequently passing through the seedbed. A field cultivator as described above may also include an optional rear auxiliary implement for finishing the seedbed for seeding. For example, a rear auxiliary implement may include a spike tooth harrow, spring tooth harrow, rolling (aka. crumbler) basket, drag tines, etc., or any combination thereof. Such agricultural tillage implements often have multiple degrees of freedom and adjustment that can affect the quality of seedbed that is produced, specifically the resulting field roughness in the direction of travel.

These adjustments may include the height of the main frame section as set by the rear main lift wheels, the height of the wing sections as set by the toolbar lift wheels, the height and angle of the main shank frame as set by hydraulics connecting it to the main frame section and as set by gauge wheel assemblies, the height and angle of the wing front shank frames as set by hydraulics connecting them to the wing sections and as set by gauge wheel assemblies, settings of the cultivator shanks themselves, as well as of rear auxiliary implements such as spring tooth drags and crumbler baskets. In order to obtain optimal results, an operator is often required to exit the towing vehicle and inspect the field and subsequently make adjustments to the agricultural implement. Not only is this a process of trial and error, but also may need to be repeated at intervals as field conditions change. It is known to use remote ground sensors to measure the distance to the ground following passage of an agricultural implement. In WO 2012/102667 A1, such a system is disclosed. However, WO 2012/102667 A1 is concerned with measuring vertical evenness between longitudinal ridges and furrows created by the agricultural implement, not with measuring the field roughness in the direction of travel of the agricultural implement.

What is needed in the art is a way to measure and respond to the quality of work performed by the agricultural implement as measured by the relative roughness in the direction of travel of the field over which the agricultural implement has passed.

SUMMARY OF THE INVENTION

The present invention provides an agricultural or industrial implement having one or more ground sensors which are used to measure relative field roughness in the direction of travel of the implement. The present invention may be embodied in a planter, disk harrow, disk ripper, in-line ripper, or vertical tillage implement, as non-limiting examples. Further, the present invention may be embodied in a non-agricultural machine, such as a bulldozer, grader, trencher, snow plough, landfill or soil compactor, or mining excavator, as further non-limiting examples. Further, the present invention may be incorporated into a self-powered machine. The present invention may use one or more low-cost ultrasonic sensors oriented towards the ground that measure instantaneous distance by the travel time of ultrasonic sound waves and their echoes. Such low-cost ultrasonic sensors may be used due to the fact that they are capable of measuring distance remotely, operate at high resolution, and are generally not affected by dust. Alternately, other types of sensors may be used that function to measure distance remotely and at high resolution, such as radar, infrared, laser, or sonar. The present invention provides a controller that may control various hydraulic cylinders and functions of the agricultural implement on the basis of the output of the one or more ground sensors. For example, rear ground sensors may be connected to the controller, so that output from the rear ground sensors is used by the controller to determine the relative roughness in the direction of travel of the field over which the field cultivator has passed, thereby giving an indication of the quality of work performed by the agricultural implement. The controller or other device, whether connected directly to the field cultivator or carried by the towing vehicle, may utilize this information to make adjustments to the field cultivator.

The present invention further provides that output from front ground sensors may be used by the controller to determine the relative roughness in the direction of travel of the field over which the field cultivator is about to pass, which may be compared to the relative roughness in the direction of travel of the field after the field cultivator has passed over it. This comparison gives further indication of the quality of work performed by the agricultural implement. The present invention further provides that the controller of the field cultivator may store and use the instantaneous output provided by the rear ground sensors and the instantaneous output provided by the front ground sensors, if applicable, to calculate an average variance in the surface of the ground as the agricultural implement moves in the travel direction for the after working and before working positions, respectively. The controller may implement statistical post-processing to convert the instantaneous output into useful statistical parameters, such as average variance.

When both front and rear ground sensors are used, the change in average variance in the surface of the ground from before being worked by the field cultivator to after being worked by the field cultivator may be calculated by the controller, thereby giving a further indication of the quality of work being performed by the agricultural implement. When only rear ground sensors that sense the ground after it has been worked by the field cultivator are used, the controller may instead compare the average variance calculated from the output of the rear ground sensors to a target value, thereby giving an indication of the quality of work being performed by the agricultural implement.

A single rear ground sensor or a single rear ground sensor and a single front ground sensor may be used to determine the average variance and/or the change in average variance of the surface of the ground for the entire agricultural implement. Alternately, a rear ground sensor or a rear ground sensor and a front ground sensor may be used to determine the average variance and/or the change in average variance of the surface of the ground for each section of the agricultural implement, for example for a main shank frame and each of a left inner wing section, a right inner wing section, a left middle wing section, a right middle wing section, a left outer wing section, and a right outer wing section.

In another embodiment of the present invention, the controller or other device which receives the output of the rear ground sensor or sensors and/or the front ground sensor or sensors incorporates or is connected to a position locating system such as GPS. In this way, the average variance of the surface of the ground after having been worked by the agricultural implement and/or the change in average variance of the surface of the ground from before having been worked by the agricultural implement to after having been worked by the agricultural implement may be correlated with the physical location of the agricultural implement. This information may be recorded in, for example, a field mapping system, which field mapping system may be remote or may be directly incorporated within the controller. The location correlated ground surface average variance information and/or location correlated change in ground surface average variance information may subsequently be used by the controller and/or one or more controllers within the towing vehicle during subsequent agricultural operations, such as fertilizing or seeding. Furthermore, the recorded location correlated ground surface average variance information may be used during subsequent passes of the agricultural tillage implement itself in making adjustments to the agricultural tillage implement.

The controller may incorporate one or more algorithms, learning routines, or fuzzy logic to recognize the significance of trends or momentary changes within the sensor output or recorded data. Further, the controller may incorporate one or more algorithms, learning routines, or fuzzy logic to recognize how changes to settings of the agricultural implement affect the desired ground surface average variance and/or change in average ground surface average variance. In this way, the controller may continuously improve the performance of the agricultural tillage implement according to its individual characteristics and according to unique field conditions.

The invention in one form is directed to a system for measuring the roughness of the ground surface over which an implement passes as measured in the direction of travel of the implement. The system includes at least one ground sensor attached to the implement that provides measurement of the distance to the ground. A controller is connected to the at least one ground sensor, and controls at least one adjustment of the implement. The at least one ground sensor provides instantaneous output based on the distance to the ground to the controller. The controller then calculates at least one statistical parameter from the instantaneous output of the at least one ground sensor.

The at least one statistical parameter is calculated from variations in the distance to the ground in the direction of travel of the implement.

The invention in another form is directed to a method for measuring the roughness of the ground surface over which an implement having at least one ground engaging component passes as measured in the direction of travel of the implement. The method includes several steps. The first step is providing at least one ground sensor attached to the implement for providing measurement of the distance to the ground. The second step is providing a controller connected to the at least one ground sensor for controlling at least one adjustment of the implement. The third step is the at least one ground sensor providing to the controller instantaneous output based on the distance to the ground. The fourth step is the controller calculating at least one statistical parameter from the instantaneous output of the at least one ground sensor. The at least one statistical parameter is calculated from variations in the distance to the ground in the direction of travel of the An advantage of the present invention is that it may use low-cost ultrasonic sensors that are not affected by dust to provide instantaneous high resolution measurements to the ground surface, which are then used to produce useful statistical parameters such as average ground surface variance that give an indication of the quality of work of an agricultural implement, Another advantage is that the present invention allows for feedback signal control of one or more adjustments of the agricultural implement based on the statistical parameters representing the performance of the agricultural implement. In this way, an operator is relieved of the necessity of manually exiting the towing vehicle, checking the ground surface after the agricultural implement has passed over it, and making responsive adjustments to the agricultural implement.

Another advantage of the present invention is that it may be used with a position locating system such as GPS, so that the statistical parameters are correlated to a physical location. The location correlated statistical parameters may then be used in subsequent agricultural operations, either by the same agricultural implement, or by other agricultural implements performing separate functions.

BRIEF DESCRIPTION OF THE DRAWINGS

The above-mentioned and other features and advantages of the invention, and the manner of attaining them, will become more apparent and the invention will be better understood by reference to the following description of embodiments of the invention taken in conjunction with the accompanying drawings, wherein.

DETAILED DESCRIPTION OF THE INVENTION

The terms "agricultural tillage implement," "field cultivator," and "ultrasonic sensor" are used principally throughout this specification for convenience but it is to be understood that these terms are not intended to be limiting. Thus, "agricultural tillage implement" or "field cultivator" may refer to any type of ground engaging agricultural or industrial implement. "Ultrasonic sensor" refers to a sensor that measures distance without physical contact using sound waves, but should not be construed as limiting and may represent an another type of sensor that functions to measure distance remotely and at high resolution, such as radar, infrared, laser, or sonar, as non-limiting examples.

Figure 1:
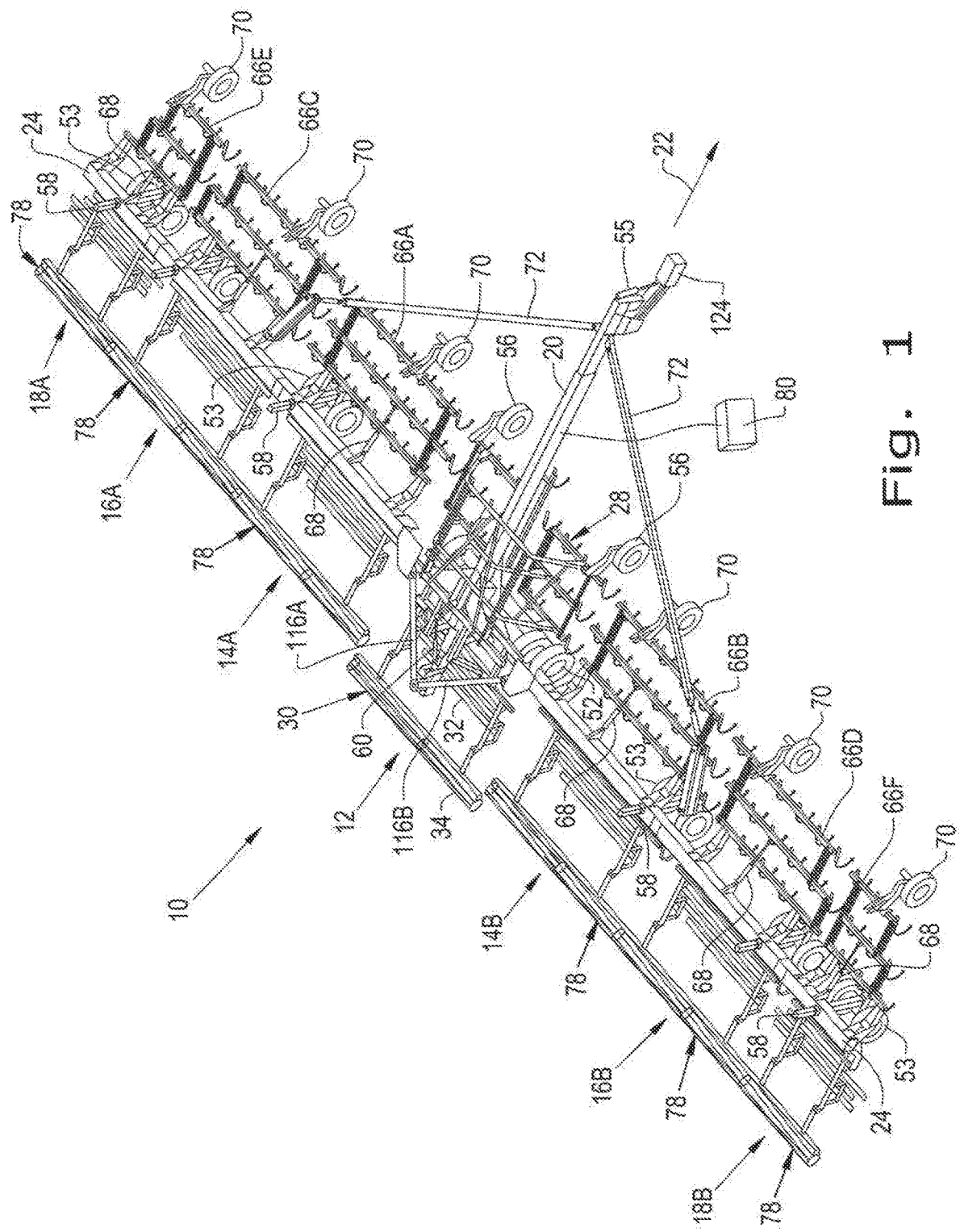
FIG. 1 is a top perspective view of an embodiment of an agricultural tillage implement incorporating the present invention, in the form of a field cultivator.
Figure 2:
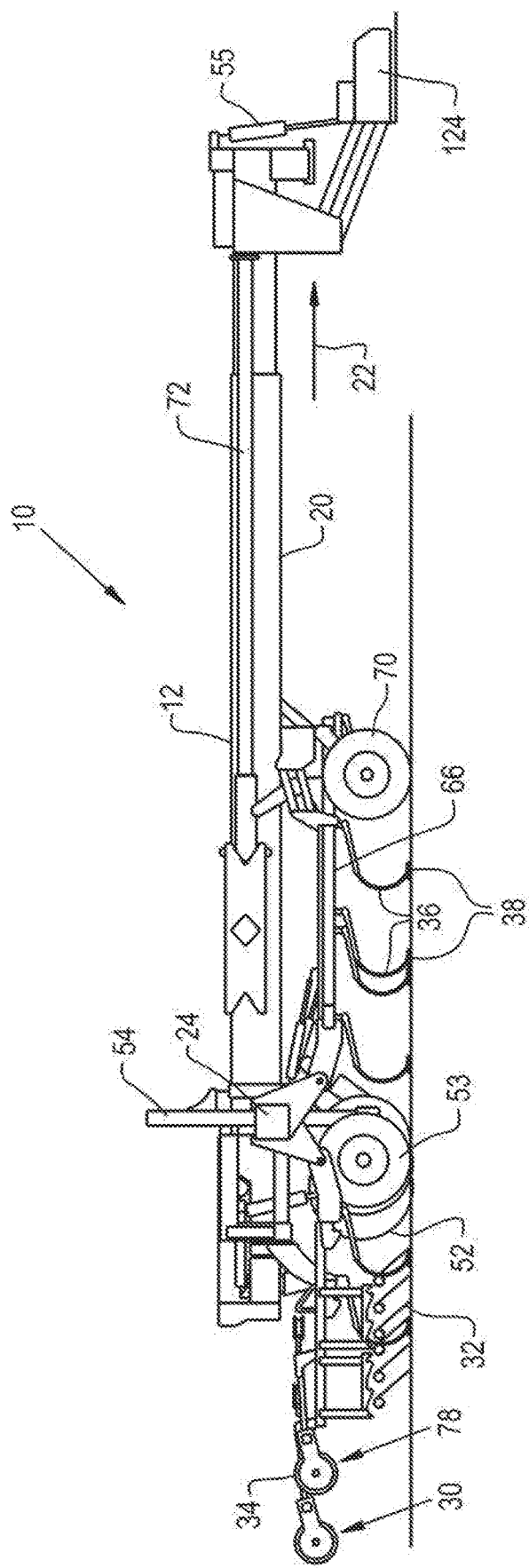
FIG. 2 is a side view of the agricultural tillage implement shown in FIG. 1.

Referring now to the drawings, and more particularly to FIGS. 1 and 2, there is shown an embodiment of an agricultural tillage implement incorporating the present invention. In the illustrated embodiment, the agricultural tillage implement 10 is in the form of a field cultivator for tilling and finishing soil prior to seeding. However, the present invention may be embodied in a planter, disk harrow, disk ripper, in-line ripper, or vertical tillage implement, as non-limiting examples. Further, the present invention may be embodied in a non-agricultural machine, such as a bulldozer, grader, trencher, snow plough, landfill or soil compactor, or mining excavator, as nonlimiting examples. Further, the present invention is shown as being incorporated into a towed implement, whereas it is contemplated that a self-powered machine is also within the scope of the invention.

Agricultural tillage implement 10 is configured as a multi-section field cultivator, and includes a main frame section 12 and a plurality of wing sections 14A, 14B, 16A, 16B, 18A, and 18B. The left wings sections are designated 14A, 16A and 18A, and the right wing sections are designated 14B, 16B and 18B. Wing sections 14A and 14B are each inner wing sections, wing sections 16A and 16B are each middle wing sections, and wing sections 18A and 18B are each outer wing sections. Main frame section 12 is the center section that is directly towed by a traction unit, such as an agricultural tractor (not shown). Main frame section 12 includes a pull hitch tube 20 extending in a travel direction 22, and a tool bar 24 which is coupled with and extends transverse to pull hitch tube 20. Main frame section 12 generally functions to carry a main shank frame 28 for tilling the soil, and a main rear auxiliary implement 30 for finishing the soil. Main rear auxiliary implement 30 includes a spring tooth drag 32 and a rolling (aka, crumbler) basket 34 which coact with each other to finish the soil. However, main rear auxiliary implement 30 can be differently configured, such as a spike tooth drag, cultivator shanks, etc.

Main shank frame 28 generally functions to carry cultivator shanks 36 with shovels 38 at their lower ends for tilling the soil. Main frame section 12 may be raised up and down using rear lift wheels 52 using hydraulic cylinder 54 and using hydraulic cylinder 55 connected to pull hitch 124. Main shank frame 28 also includes one or more gauge wheel assemblies 56 which function to level main shank frame 28. In the illustrated embodiment, main shank frame 28 includes two gauge wheel assemblies 56. Toolbar lift wheels 53 may be used to raise and lower wing sections 14A, 14B, 16A, 16B, 18A, and 18B along with the main frame section 12, using hydraulic cylinders 58. Another hydraulic cylinder 60 may further raise or lower the main shank frame 28 independent of the main frame section 12.

Wing front shank frames 66A, 66B, 66C, 66D, 66E, and 66F of the wing sections 14A, 14B, 16A, 168, 18A, and 18B may be further raised and lowered using hydraulic cylinders 68, and may include one or more gauge wheel assemblies 70 which function to level the wing front shank frames 66A, 66B, 66C, 66D, 66E, and 66F. Wing section rear auxiliary implements 78, which may include spring tooth drags, crumbler baskets, spike tooth drags, cultivator shanks, or any combination thereof, may also be further raised and lowered. Diagonally angled draft tubes 72 extend between a forward end of pull hitch tube 20 and a respective tool bar 24 associated with the pair of middle wing sections 16A and 16B. Left main fold hydraulic cylinder 116A and right main fold hydraulic cylinder 116B may fold wing sections 14A, 14B, 16A, 16B, 18A, and 188 forward for transport as needed.

A controller 80 may be provided for controlling the various hydraulic cylinders and functions of the field cultivator 10.

Figure 3:
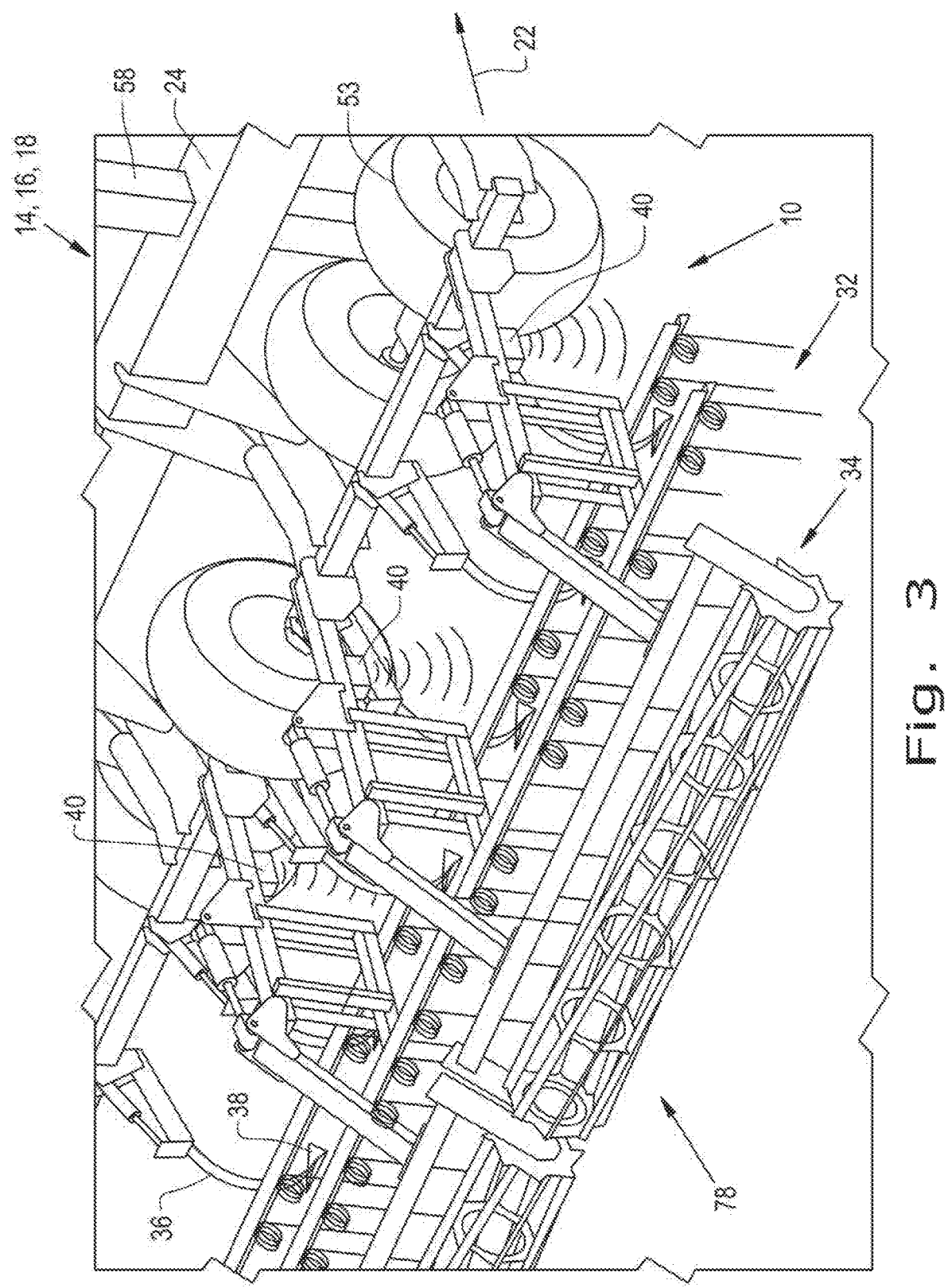
FIG. 3 is a partial rear perspective view of an embodiment of an agricultural tillage implement incorporating the present invention, in the form of a field cultivator.

Turning now to FIG. 3, there is shown a partial isometric rear view of a field cultivator 10. Wing section rear auxiliary implements 78 are attached to the toolbar 24 of the wing sections 14, 16, 18, so that the wing section rear auxiliary implements 78 are pulled along in the travel direction 22. Toolbar lift wheels 53 are connected to the toolbar 24 of the wing sections 14, 16, 18 by way of hydraulic cylinders 58, so that the wing sections 14, 16, 18 may be raised and lowered using the hydraulic cylinders 58. The wing section rear auxiliary implements 78 may be provided with cultivator shanks 36, in addition to the cultivator shanks of the wing front shank frames 66 (not shown in FIG. 3). The cultivator shanks 36 of both the wing section rear auxiliary implements 78, if provided, and those of the wing front shank frames 66 have shovels for tilling the ground. The wing section rear auxiliary implements 78 are, for example, provided with spring tooth drags 32 and crumbler baskets 34.

The field cultivator 10 is further provided with one or more rear ground sensors 40 which may be ultrasonic ground sensors 40. Alternately, the ground sensors 40 may be another type of sensor that functions to measure distance remotely and at high resolution, such as radar, infrared, laser, or sonar, as non-limiting examples. The rear ground sensors 40 are shown attached to the wing section rear auxiliary implements 78 so that they sense the ground after it has been worked by the cultivator shanks 36 of the field cultivator 10. As shown, the rear ground sensors 40 are attached to the wing section rear auxiliary implement 78 subsequent to the cultivator shanks 36.

Alternately, the rear ground sensors 40 may be attached rearward of the spring tooth drags 32 and/or the crumbler baskets 34, or may be attached to the toolbar 24 just to the rear of the main shank frame 28 and wing front shank frames 66 (not shown in FIG. 3). The rear ground sensors 40 are connected to the controller 80 (not shown in FIG. 3), so that output from the rear ground sensors 40 is used by the controller to determine the relative roughness in the direction of travel of the field over which the field cultivator 10 has passed, thereby giving an indication of the quality of work performed by the agricultural implement. Alternately, the output from the rear ground sensors 40 is passed to a controller or other device in the towing vehicle (not shown).

The controller 80 or other device, whether connected directly to the field cultivator 10 or carried by the towing vehicle, may utilize this information to make adjustments to the field cultivator 10 using the hydraulic cylinders 54, 55, 58, 60, and 68. The controller 80 may be an electrical processing circuit (EPC), which EPC may be configured as any type of suitable processor, such as a digital controller, an analog processor, hardwired components, or an application specific integrated circuit (ASIC).

Figure 4:
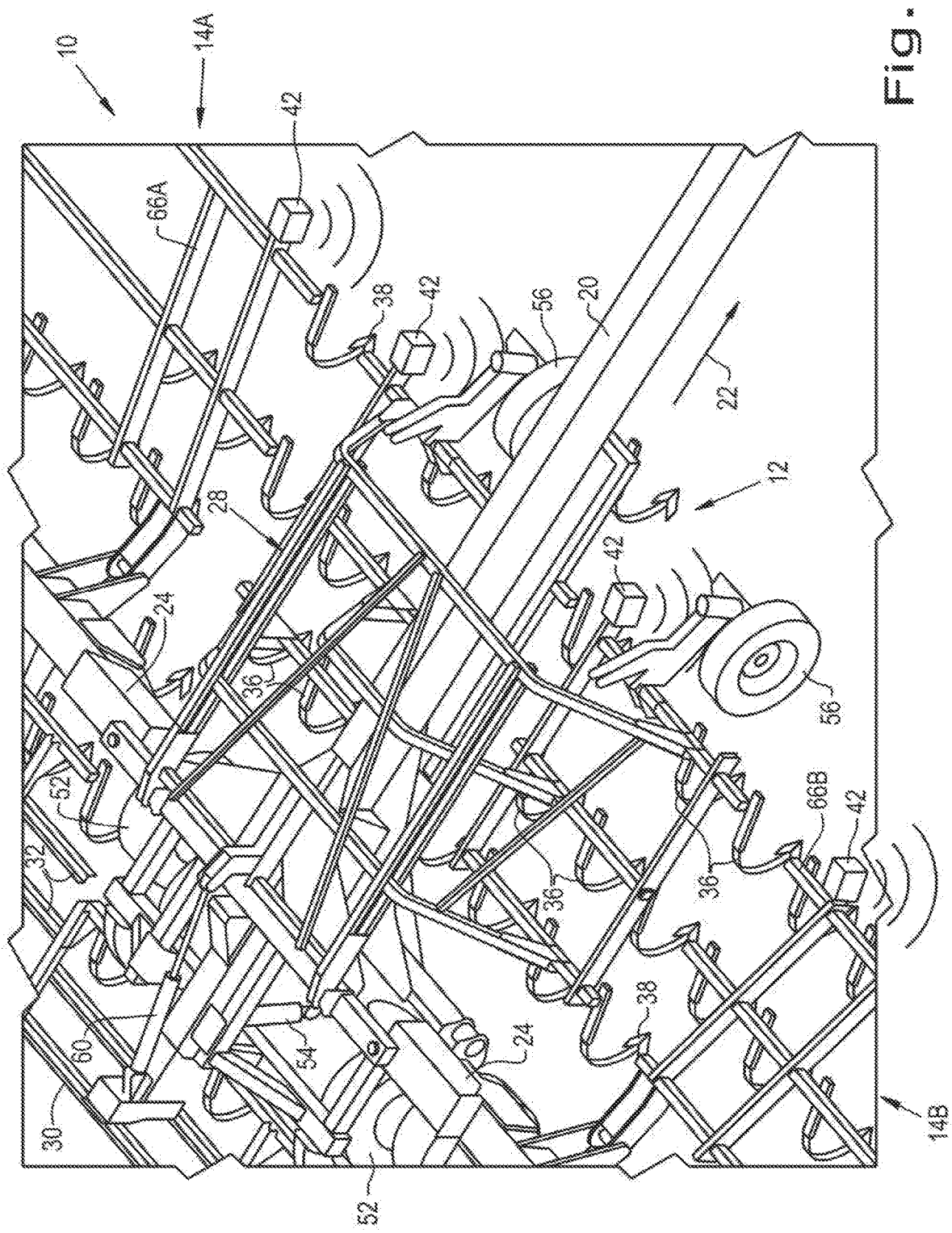
FIG. 4 is a partial front perspective view of an embodiment of an agricultural tillage implement incorporating the present invention, in the form of a field cultivator.

Turning now to FIG. 4, there is shown a partial isometric front view of a field cultivator 10. The main frame section 12 again includes a toolbar 24 and a main shank frame 28. Wing sections, of which only left inner wing section 14A and right inner wing section 14B are visible, have left inner wing front shank frame 66A and right inner wing front shank frame 66B, respectively. A pull hitch tube 20 extends in the travel direction 22 so that the field cultivator 10 may be attached to a towing vehicle (not shown). Rear lift wheels 52 are attached to the main frame section 12 and are actuated by hydraulic cylinders 54, so that the rear lift wheels 52 may be used to raise and lower the main frame section 12. Additional hydraulic cylinders 58 actuate toolbar lift wheels 53 (not shown) in order to raise and lower the wing sections 14, 16, 18 in similar manner. Each of the main shank frame 28 and wing front shank frames 66 is provided with multiple cultivator shanks 36 having shovels 38 for tilling the ground. Main shank frame 28 also includes one or more gauge wheel assemblies 56 which function to level main shank frame 28. In the illustrated embodiment, main shank frame 28 includes two gauge wheel assemblies 56. Another hydraulic cylinder 60 may further raise or lower the main shank frame 28 independent of the main frame section 12. A main rear auxiliary implement 30 including spring tooth drags 32 and crumbler baskets 34 (not shown) may be attached to the main shank frame 28. In the embodiment shown in FIG. 4, one or more front ground sensors 42 precede the cultivator shanks 36. These again may be ultrasonic ground sensors 42, or may be another type of sensor that functions to measure distance remotely and at high resolution, such as radar, infrared, laser, or sonar, as non-limiting examples. The front ground sensors 42 are shown attached to the front of the main shank frame 28, as well as to the front of the wing front shank frames 66. The front ground sensors 42, which are also connected to the controller 80 (not shown in FIG. 4), again provide output to the controller 80 or to another device in the towing vehicle (not shown). The output from the front ground sensors 42 is used by the controller to determine the relative roughness in the direction of travel of the field over which the field cultivator is about to pass, which may be compared to the relative roughness in the direction of travel of the field after the field cultivator has passed over it. This gives further indication of the quality of work performed by the agricultural implement.

Figure 5:
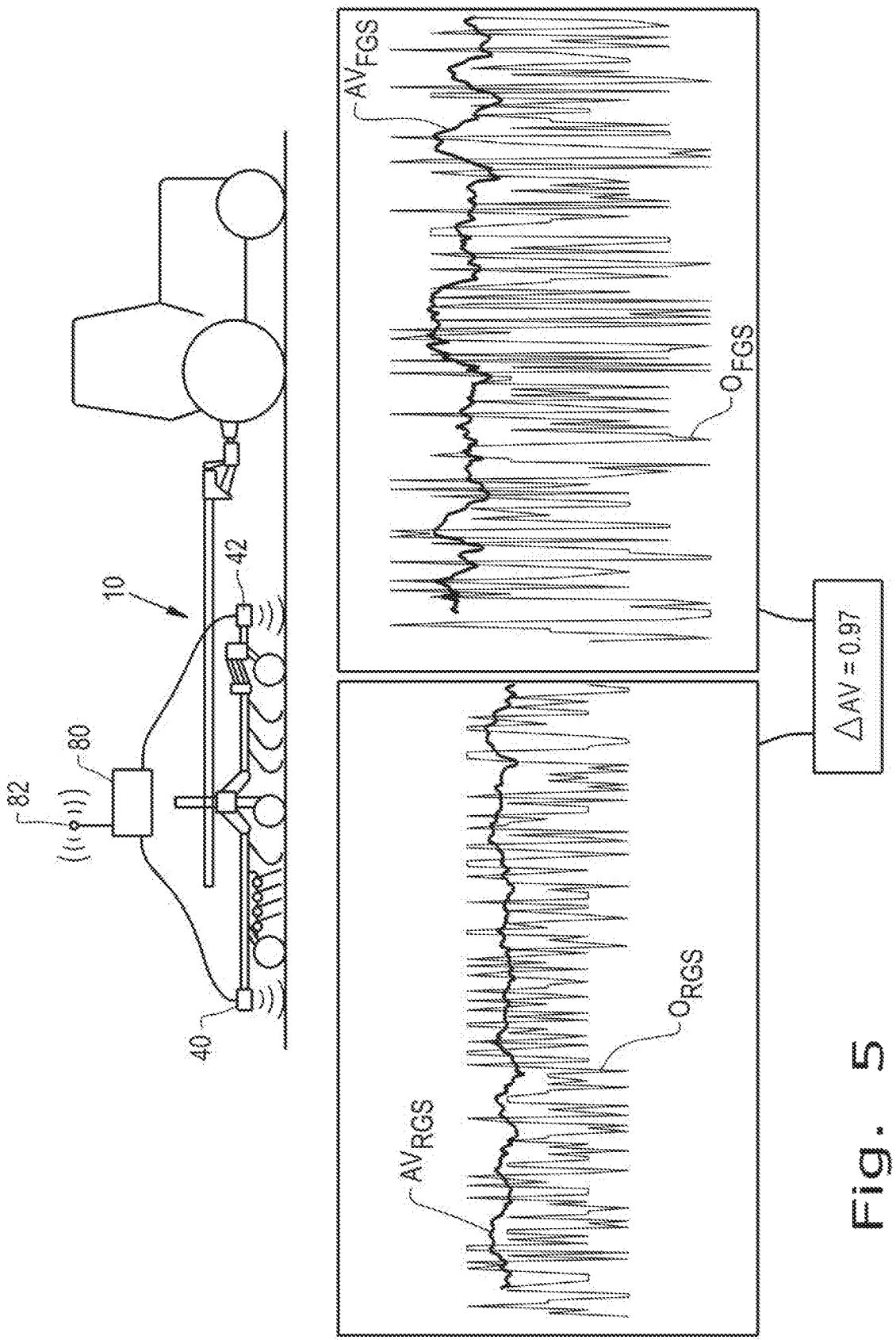
FIG. 5 is a graphical representation of an embodiment of an agricultural tillage implement incorporating the present invention, in the form of a field cultivator.

As shown in FIG. 5, the controller 80 of the field cultivator 10 stores and uses the instantaneous output $O_{RGS}$ provided by the rear ground sensors 40 and the instantaneous output $O_{FGS}$ provided by the front ground sensors 42, if applicable, to calculate an average variance $AV_{RGS}$ and $AV_{FGS}$ in the surface of the ground as the agricultural implement moves in the travel direction for the after working and before working positions, respectively. In order to accomplish this, the controller 80 implements statistical postprocessing to convert the instantaneous output $O_{RGS}$, $O_{FGS}$ into useful statistical parameters, such as average variance $AV_{RGS}$, $AV_{FGS}$. This may include plotting the ground vertical displacement over time or over distance as shown. In other words, the controller 80 calculates the average variance $AV_{FGS}$ in the surface of the ground as the agricultural implement moves in the travel direction prior to the ground being worked using the output $O_{FGS}$ of the front ground sensors 42.

The controller 80 calculates the average variance $AV_{RGS}$ in the surface of the ground as the agricultural implement moves in the travel direction after the ground has been worked using the output $O_{RGS}$ of the rear ground sensors 40. When both front and rear ground sensors 40 and 42 are used, the change in average variance $\Delta AV$ in the surface of the ground from before being worked by the field cultivator 10 to after being worked by the field cultivator 10 is calculated by the controller 80, thereby giving an indication of the quality of work being performed by the agricultural implement. This may be presented as a changing value as shown, or may be presented in graphical format. When only the rear ground sensors 40 that sense the ground after it has been worked by the cultivator shanks 36 of the field cultivator 10 are used, the controller 80 compares the average variance $AV_{RGS}$ calculated from the output $O_{RGS}$ of the rear ground sensors 40 to a target value, thereby giving an indication of the quality of work being performed by the agricultural implement.

The controller 80 or other device, whether connected directly to the field cultivator 10 or carried by the towing vehicle, may again utilize the average variance $AV_{RGS}$ and $AV_{FGS}$ and/or the change in average variance $\Delta AV$ of the ground surface to make adjustments to the field cultivator 10 using the hydraulic cylinders 54, 55, 58, 60, and 68. A single rear ground sensor 40 or a single rear ground sensor 40 and a single front ground sensor 42 may be used to determine the average variance $AV_{RGS}$ and $AV_{FGS}$ and/or the change in average variance $\Delta AV$ of the surface of the ground for the entire agricultural implement 10. Alternately, a rear ground sensor 40 or a rear ground sensor 40 and a front ground sensor 42 may be used to determine the average variance $AV_{RGS}$ and $AV_{FGS}$ and/or the change in average variance $\Delta AV$ of the surface of the ground for each section of the agricultural implement 10, for example for the main shank frame 28 and each of the left inner wing section 14A, right inner wing section 14B, left middle wing section 16A, right middle wing section 16B, left outer wing section 18A, and right outer wing section 18B.

In another embodiment, the controller 80 or other device which receives the output $O_{RGS}$, $O_{FGS}$ of the rear ground sensor or sensors 40 and/or the front ground sensor or sensors 42 incorporates or is connected to a position locating system 82 such as GPS. In this way, the average variance $AV_{RGS}$ of the surface of the ground after having been worked by the agricultural implement 10 and/or the change in average variance $\Delta AV$ of the surface of the ground from before having been worked by the agricultural implement 10 to after having been worked by the agricultural implement 10 is correlated with the physical location of the agricultural implement 10.

This information may be recorded in, for example, a field mapping system, which field mapping system may be remote or may be directly incorporated within the controller 80. The location correlated ground surface average variance information $AV_{RGS}$ and $AV_{FGS}$ and/or change in ground surface average variance information $\Delta AV$ may subsequently be used by the controller 80 and/or one or more controllers within the towing vehicle during subsequent agricultural operations, such as fertilizing or seeding. For example, recorded location correlated ground surface average variance $AV_{RGS}$ that indicates an area of high ground surface roughness may be used by such controllers to set a low forward speed of the towing vehicle when subsequently seeding. Other factors that may be varied as a result of recorded location correlated ground surface average variance information $AV_{RGS}$ and $AV_{FGS}$ may include, but are not limited to, seeding depth, seeding density, and fertilizer application rate. Furthermore, the recorded location correlated ground surface average variance information $AV_{RGS}$ and $AV_{FGS}$ may be used during subsequent passes of the agricultural tillage implement 10 itself in making adjustments to the agricultural tillage implement 10.

Whether the controller 80 is using the average variance $AV_{RGS}$ and $AV_{FGS}$ and/or the change in average variance $\Delta AV$ of the ground surface to make adjustments to the field cultivator 10 using the hydraulic cylinders 54, 55, 58, 60, and 68 during an individual pass, or whether the controller 80 and/or one or more controllers within the towing vehicle is using recorded location correlated ground surface average variance $AV_{RGS}$ and $AV_{FGS}$ and/or change in average ground surface average variance $\Delta AV$ to make adjustments during subsequent agricultural operations, the controller 80 may incorporate one or more algorithms, learning routines, or fuzzy logic to recognize the significance of trends or momentary changes within the sensor output $O_{RGS}$, $O_{FGS}$ or recorded data. Further, the controller 80 may incorporate one or more algorithms, learning routines, or fuzzy logic to recognize how changes to settings of the agricultural implement 10 affect the desired ground surface average variance $AV_{RGS}$ and/or change in average ground surface average variance $\Delta AV$. In this way, the controller 80 may continuously improve the performance of the agricultural tillage implement 10 according to its individual characteristics and according to unique field conditions.

The invention claimed is:

1. A system for measuring the roughness in the direction of travel of an implement of the ground surface over which the implement passes, the system comprising:
   at least one ground sensor comprising at least one rear ground sensor, said at least one ground sensor providing measurement of the distance to the ground;
   a controller connected to said at least one ground sensor, said controller controlling at least one adjustment of the implement;
   said at least one ground sensor providing to the controller instantaneous output based on the distance to the ground;
   the controller calculating at least one statistical parameter from said instantaneous output of said at least one ground sensor, said at least one statistical parameter being calculated from variations in the distance to the ground in the direction of travel of the implement, said at least one statistical parameter further comprises at least one statistical parameter calculated from instantaneous output received from said at least one rear ground sensor.

2. The system of claim 1, wherein:
   said at least one statistical parameter further comprises one of the variance and the average variance in the distance to the ground in the direction of travel of the implement.

3. The system of claim 1, wherein:
   said at least one ground sensor further comprises at least one front ground sensor; and
   said at least one statistical parameter further comprises at least one statistical parameter calculated from instantaneous output received from said at least one front ground sensor.

4. The system of claim 3, wherein:
   said controller further calculates a difference between said at least one statistical parameter calculated from instantaneous output received from said at least one front ground sensor and said at least one statistical parameter calculated from instantaneous output received from said at least one rear ground sensor.

5. The system of claim 1, wherein:
   said controller controls said at least one adjustment of the implement based on said at least one statistical parameter.

6. The system of claim 1, wherein:
   said controller being connected to a position locating system, said controller correlating said at least one statistical parameter to a location.

7. The system of claim 6, wherein:
   said location correlated at least one statistical parameter being used in a subsequent operation.

8. A method for measuring the roughness in the direction of travel of an implement having at least one ground engaging component of the ground surface over which the implement passes, comprising the steps of:
   providing at least one ground sensor at least one rear ground sensor attached to the implement rearward of the at least one ground engaging component, said at least one ground sensor providing measurement of the distance to the ground;
   providing a controller connected to the at least one ground sensor, said controller controlling at least one adjustment of the implement;
   said at least one ground sensor providing to the controller instantaneous output based on the distance to the ground; and
   the controller calculating at least one statistical parameter from said instantaneous output of said at least one ground sensor, said at least one statistical parameter being calculated from variations in the distance to the ground in the direction of travel of the implement, said at least one statistical parameter further comprises at least one statistical parameter calculated from instantaneous output received from said at least one rear ground sensor.

9. The method of claim 8, wherein:
   said at least one statistical parameter further comprises one of the variance and the average variance in the distance to the ground in the direction of travel of the implement.

10. The method of claim 8, wherein:
    said at least one ground sensor further comprises at least one front ground sensor attached to the implement forward of the at least one ground engaging component; and
    said at least one statistical parameter further comprises at least one statistical parameter calculated from instantaneous output received from said at least one front ground sensor.

11. The method of claim 10, further comprising the step of:
    said controller calculating a difference between said at least one statistical parameter calculated from instantaneous output received from said at least one front ground sensor and said at least one statistical parameter calculated from instantaneous output received from said at least one rear ground sensor.

12. The method of claim 8, further comprising the step of:
    said controller controlling said at least one adjustment of the implement based on said at least one statistical parameter.

13. The method of claim 8, wherein:
said controller being connected to a position locating system, said controller correlating said at least one statistical parameter to a location.

14. The method of claim 13, wherein:
said location correlated at least one statistical parameter being used in a subsequent operation.

\* \* \* \* \*